United States Patent
McRorie

(10) Patent No.: US 8,677,911 B2
(45) Date of Patent: Mar. 25, 2014

(54) TECHNOLOGY CART

(75) Inventor: Robert Grant McRorie, Huntersville, NC (US)

(73) Assignee: Rubbermaid Incorporated, Huntersville, NC (US)

( * ) Notice: Subject to any disclaimer, the term of this patent is extended or adjusted under 35 U.S.C. 154(b) by 148 days.

(21) Appl. No.: 13/399,212

(22) Filed: Feb. 17, 2012

(65) Prior Publication Data

US 2012/0236496 A1 Sep. 20, 2012

Related U.S. Application Data

(60) Provisional application No. 61/444,290, filed on Feb. 18, 2011.

(51) Int. Cl.
*A47B 37/00* (2006.01)

(52) U.S. Cl.
USPC .............. 108/50.02; 361/679.02; 361/679.01; 361/679.08; 248/129; 248/423

(58) Field of Classification Search
USPC .................................................. 361/679.08
See application file for complete search history.

(56) References Cited

U.S. PATENT DOCUMENTS

| | | |
|---|---|---|
| 844,083 A | 2/1907 | Barrella |
| 1,730,028 A | 10/1928 | Ball |
| 2,077,337 A | 4/1937 | Lifvendahl et al. |
| 3,089,742 A | 5/1963 | Powell |
| 3,862,734 A | 1/1975 | Buchin et al. |
| 3,999,733 A | 12/1976 | Harder, Jr. et al. |
| 4,516,751 A | 5/1985 | Westbrook |
| 4,544,121 A | 10/1985 | Komura |
| 4,687,167 A | 8/1987 | Skalka et al. |
| 4,836,478 A | 6/1989 | Sweere |
| 4,907,773 A | 3/1990 | Menchetti et al. |
| 5,007,608 A | 4/1991 | Carroll, Jr. |
| 5,240,215 A | 8/1993 | Moore |
| 5,487,525 A | 1/1996 | Drabczyk et al. |
| 5,630,566 A | 5/1997 | Case |
| 5,632,462 A | 5/1997 | Kallas |
| D380,736 S | 7/1997 | Theis et al. |
| 5,738,316 A | 4/1998 | Sweere et al. |

(Continued)

FOREIGN PATENT DOCUMENTS

| | | |
|---|---|---|
| DE | 3409990 A1 | 7/1984 |
| FR | 2783412 A1 | 3/2000 |
| GB | 2285911 A | 8/1995 |

OTHER PUBLICATIONS

U.S. Appl. No. 12/636,181, Office Action, Oct. 21, 2011.

(Continued)

*Primary Examiner* — Anthony Q Edwards
(74) *Attorney, Agent, or Firm* — Dennis J. Williamson; Moore & Van Allen PLLC

(57) ABSTRACT

A lower housing portion and an upper housing portion define an internal technology box that holds a lap top computer such that the base of the laptop is securely held in the technology box while the screen extends above the work surface. The technology box is located remotely from the work surface/keyboard stack. The upper housing may be moved from a closed use position to a partially open, forward position allowing a user to access the power button of laptop and to a fully open position where the laptop may be removed.

18 Claims, 10 Drawing Sheets

(56) References Cited

U.S. PATENT DOCUMENTS

| | | | |
|---|---|---|---|
| 5,743,503 A | 4/1998 | Voeller et al. | |
| 5,791,623 A | 8/1998 | Louridas | |
| 5,797,568 A | 8/1998 | Canton Gongora et al. | |
| 5,842,672 A | 12/1998 | Sweere et al. | |
| 5,876,008 A | 3/1999 | Sweere et al. | |
| D412,161 S | 7/1999 | Theis et al. | |
| 5,924,665 A | 7/1999 | Sweere et al. | |
| D413,110 S | 8/1999 | Sweere et al. | |
| 5,944,896 A | 8/1999 | Landesman et al. | |
| 5,947,429 A | 9/1999 | Sweere et al. | |
| 5,967,479 A | 10/1999 | Sweere et al. | |
| 5,992,809 A | 11/1999 | Sweere et al. | |
| 6,012,693 A | 1/2000 | Voeller et al. | |
| 6,015,120 A | 1/2000 | Sweere et al. | |
| 6,019,332 A | 2/2000 | Sweere et al. | |
| D423,745 S | 4/2000 | Theis et al. | |
| D431,736 S | 10/2000 | O'Brien et al. | |
| 6,189,849 B1 | 2/2001 | Sweere et al. | |
| 6,233,791 B1 | 5/2001 | Theis | |
| D450,903 S | 11/2001 | Wacker et al. | |
| 6,354,549 B2 | 3/2002 | Sweere et al. | |
| D455,916 S | 4/2002 | Fluhrer et al. | |
| 6,367,756 B1 | 4/2002 | Wang | |
| 6,380,484 B1 | 4/2002 | Theis et al. | |
| 6,409,134 B1 | 6/2002 | Oddsen, Jr. | |
| 6,419,196 B1 | 7/2002 | Sweere et al. | |
| 6,435,109 B1 * | 8/2002 | Dell et al. | 108/144.11 |
| 6,493,220 B1 * | 12/2002 | Clark et al. | 361/679.41 |
| 6,581,887 B2 | 6/2003 | Lapidez | |
| D477,325 S | 7/2003 | Theis et al. | |
| D477,606 S | 7/2003 | Theis et al. | |
| 6,709,058 B1 | 3/2004 | Diffrient | |
| 6,712,008 B1 | 3/2004 | Habenicht et al. | |
| 6,783,105 B2 | 8/2004 | Oddsen, Jr. | |
| 6,863,252 B2 | 3/2005 | Bosson | |
| 6,883,764 B1 | 4/2005 | Mileos et al. | |
| 6,959,965 B2 | 11/2005 | Diffrient | |
| 6,994,306 B1 | 2/2006 | Sweere et al. | |
| 6,997,422 B2 | 2/2006 | Sweere et al. | |
| 7,032,870 B2 | 4/2006 | Sweere et al. | |
| 7,048,242 B2 | 5/2006 | Oddsen, Jr. | |
| 7,063,296 B2 | 6/2006 | Williams | |
| 7,066,435 B2 | 6/2006 | Oddsen, Jr. et al. | |
| 7,147,190 B2 | 12/2006 | Welles et al. | |
| 7,152,488 B2 | 12/2006 | Hedrich et al. | |
| D535,432 S | 1/2007 | Diffrient | |
| D537,323 S | 2/2007 | Saez | |
| 7,195,213 B2 | 3/2007 | Weatherly | |
| 7,252,277 B2 | 8/2007 | Sweere et al. | |
| 7,303,173 B2 | 12/2007 | Mileos | |
| D584,908 S | 1/2009 | Diffrient | |
| 7,472,458 B2 | 1/2009 | Oddsen | |
| 7,475,946 B2 | 1/2009 | Diffrient | |
| 7,481,170 B2 | 1/2009 | Sommerfield | |
| 7,487,940 B2 | 2/2009 | Saez et al. | |
| 7,621,544 B2 * | 11/2009 | Rossini | 280/79.3 |
| 7,954,780 B2 | 6/2011 | Dittmer | |
| 8,180,485 B2 * | 5/2012 | Reckelhoff | 700/242 |
| 8,245,652 B2 * | 8/2012 | Hung | 108/50.02 |
| 8,526,176 B2 * | 9/2013 | Clark et al. | 361/679.41 |
| 2003/0001057 A1 | 1/2003 | Sweere et al. | |
| 2003/0057340 A1 | 3/2003 | Mann et al. | |
| 2005/0062370 A1 | 3/2005 | Miller | |
| 2007/0227409 A1 * | 10/2007 | Chu | 108/50.02 |
| 2007/0259554 A1 | 11/2007 | Lindblad et al. | |
| 2007/0295870 A1 | 12/2007 | Peterson et al. | |
| 2008/0001043 A1 * | 1/2008 | Meyer | 248/129 |
| 2008/0026892 A1 | 1/2008 | Asamarai et al. | |
| 2008/0142660 A1 | 6/2008 | Goldberg et al. | |
| 2008/0168930 A1 | 7/2008 | Calero | |
| 2008/0258029 A1 | 10/2008 | Zhang | |
| 2009/0212184 A1 | 8/2009 | Bourgeois et al. | |
| 2011/0233350 A1 | 9/2011 | Burgess et al. | |
| 2012/0212116 A1 | 8/2012 | McRorie et al. | |

OTHER PUBLICATIONS

U.S. Appl. No. 12/636,181, Office Action, Feb. 29, 2012.

* cited by examiner

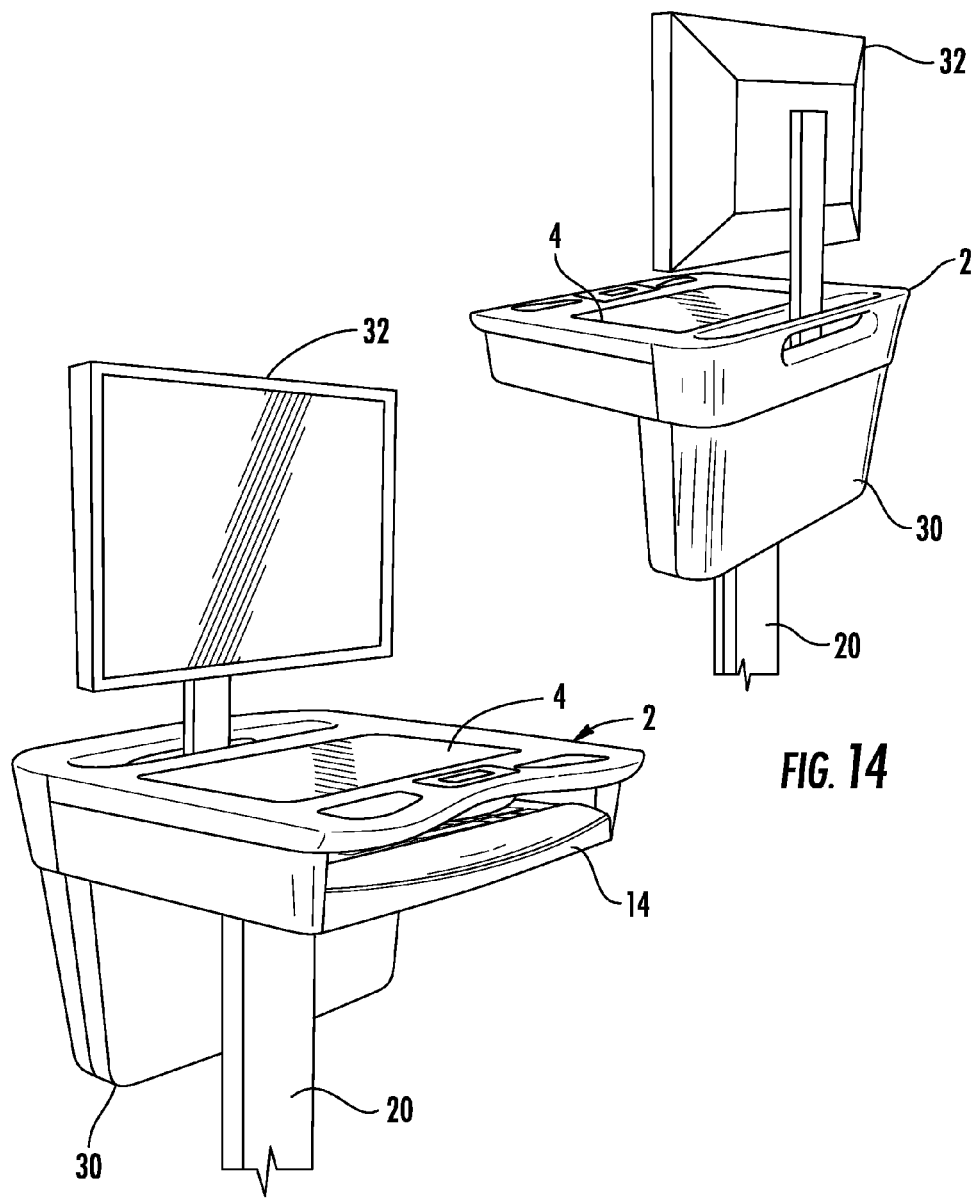

TECHNOLOGY CART

This application claims benefit of priority under 35 U.S.C. §119(e) to the filing date of U.S. Provisional Application No. 61/444,290, as filed on Feb. 18, 2011, which is incorporated herein by reference in its entirety.

BACKGROUND

Technology carts typically comprise a rolling cart that supports IT technology such as a computer, CPU or the like. Technology carts are often found in healthcare environments such as hospitals where they can be moved between patient areas for use by a healthcare professional. Technology carts may have a laptop configuration where the on-board technology comprises a lap top or a LCD/CPU configuration where the on-board technology may comprise a separate CPU and monitor, similar to a desk top computer.

SUMMARY OF THE INVENTION

A mobile technology cart comprises a first housing portion and a second housing portion mounted to the first housing portion such that a base of a laptop computer may be trapped between the first housing portion and the second housing portion with a monitor of the laptop computer extending outside of the first housing portion and the second housing portion. The first housing portion is movable relative to the second housing portion from a first position to a second position such that the base may be accessed without the laptop computer being removable from between the first housing portion and the second housing portion. The first housing portion is movable from the second position to a third position where the laptop computer is removable from between the first housing portion and the second housing portion. At least one wheel supports the first housing portion and the second housing portion.

The first housing portion and the second housing portion may be supported on an upright where the upright is height adjustable. The second housing portion may comprise a first support that comprises a keyboard tray. The second housing portion may comprise a second support positioned above the first support that defines an upwardly opening box where the base of the laptop computer is receivable in the box. The first housing portion may close the box when the first housing portion is in the first position. The first housing portion may comprise a work surface the work surface being disposed above the box when the first housing portion is in the first position. The first housing portion may be mounted to the second housing portion by a sliding hinge and a sliding latch. A latch may releasably connect the first housing portion to the second housing portion to prevent the first housing portion from moving relative to the second housing portion from the first position to the second position. A lock may be provided for preventing the first housing portion from moving from the second position to the third position. The lock may be only accessible when the first housing portion is in the second position.

A mobile technology cart comprises a housing supporting a first platform adapted to support a keyboard and a second platform adapted to support a base of a laptop computer, the second platform being disposed above the first platform. The housing comprises a first housing portion and a second housing portion where the second housing portion covers the second platform such that a monitor of the laptop computer extends above the second housing portion. The second housing portion defines a work surface where the work surface is disposed above the second platform. The housing is supported on at least one wheel.

The base of the laptop computer may be trapped between the first housing portion and the second housing portion. The first housing portion may be movable along a linear path relative to the second housing portion from a first position to a second position such that the base of the laptop computer may be accessed without the base of the laptop computer being removable from between the first housing portion and the second housing portion. The first housing portion may be mounted to the second housing portion by a sliding hinge and a sliding latch. A latch may releasably connect the first housing portion to the second housing portion to prevent the first housing portion from moving relative to the second housing portion from the first position to the second position. The first housing portion may be rotatable from the second position to a third position where the laptop computer is removable from between the first housing portion and the second housing portion. A lock may prevent the first housing portion from moving from the second position to the third position. The lock may be only accessible when the first housing portion is in the second position. The housing may be supported on an upright where the upright is height adjustable. The second platform may define an upwardly opening box where the second housing portion closes the box.

BRIEF DESCRIPTION OF THE DRAWINGS

FIG. 13 is a front perspective view of an alternate embodiment of the cart of the invention.

FIG. 14 is a back perspective view of the cart of FIG. 13.

DETAILED DESCRIPTION OF EMBODIMENTS OF THE INVENTION

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items. Relative terms such as "below" or "above" or "upper" or "lower" or "horizontal" or "vertical" or "rear" or "front" may be used herein to describe a relationship of one element or component to another element or component as illustrated in the figures to facilitate explanation of the figures.

Figure 6:
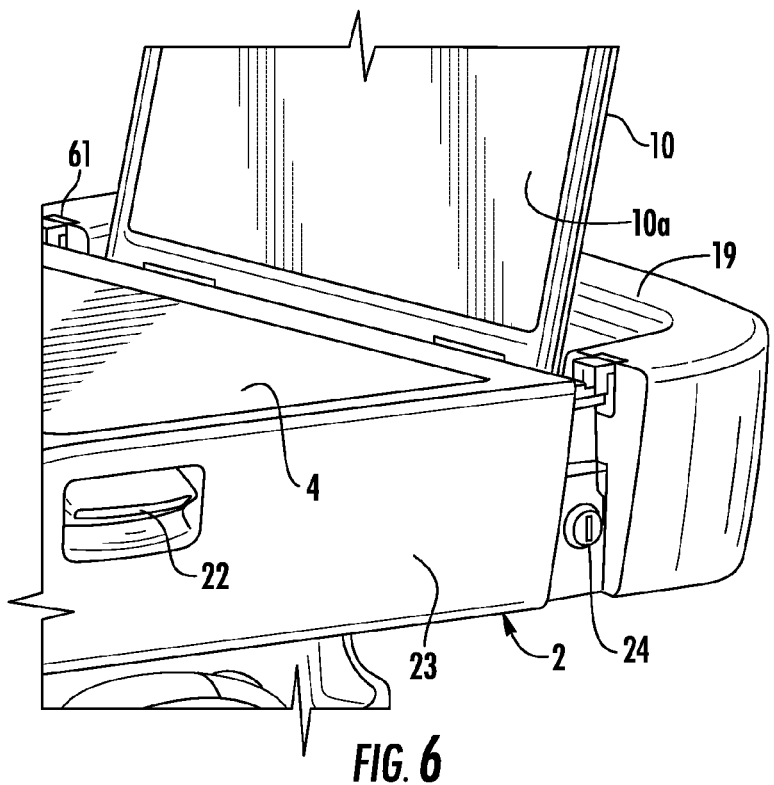
FIG. 6 is a more detailed perspective view of the cart as shown in FIG. 5.
Figure 7:
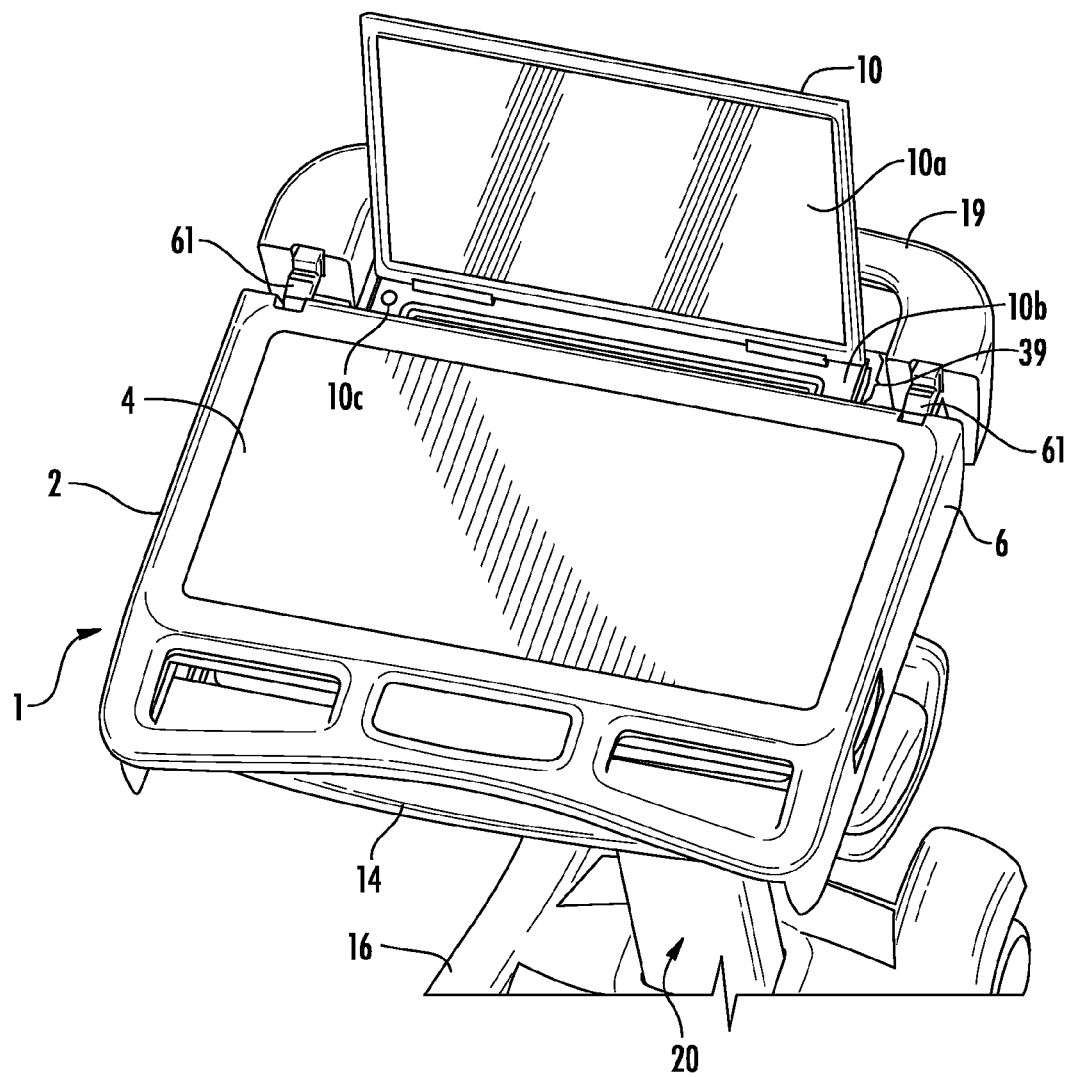
FIG. 7 is a detailed top perspective view of the cart as shown in FIG. 5
Figure 8:
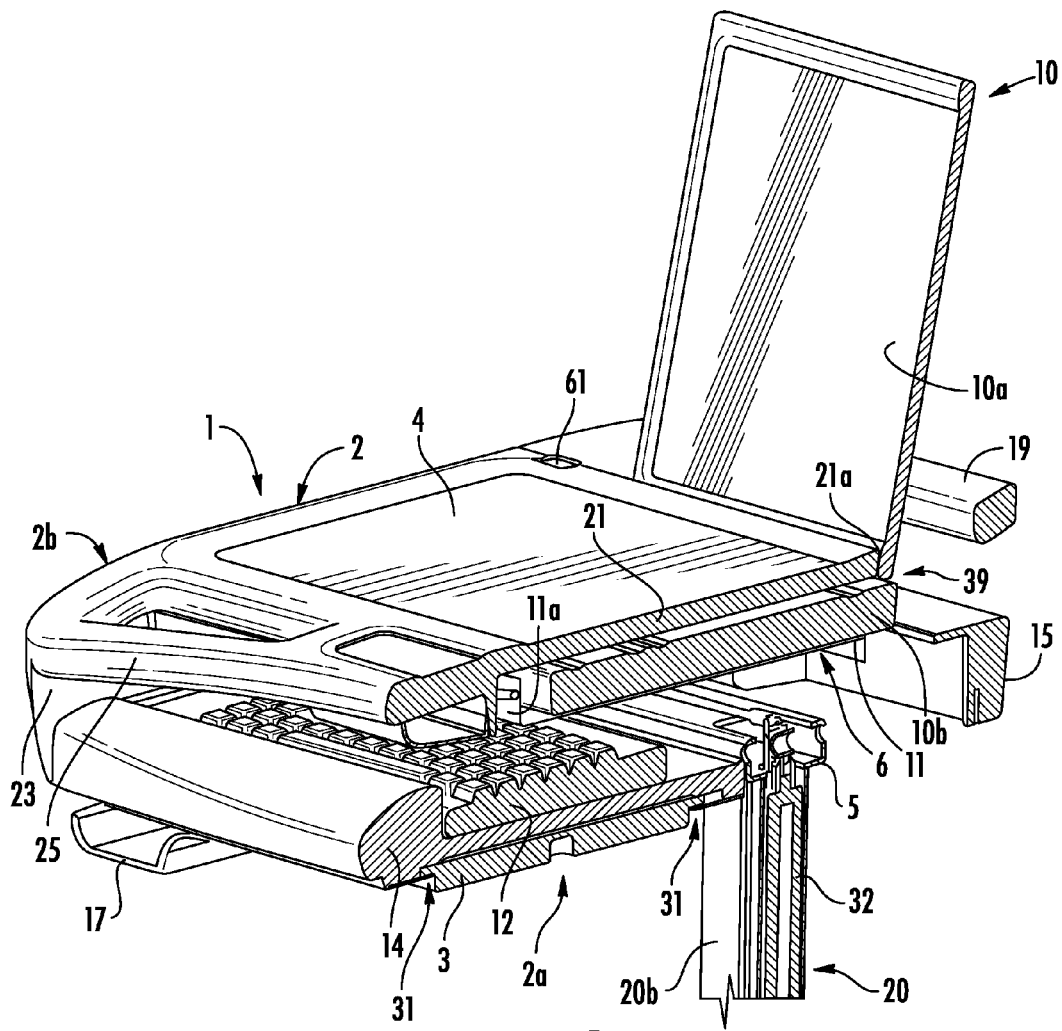
FIG. 8 is a partial section view of the cart as shown in FIG. 1.

One embodiment of the cart of the invention is shown in FIGS. 1 through 12. The cart comprises a wraparound work platform 1 comprising a housing 2. Housing 2 is comprised of a lower housing portion 2a and an upper housing portion 2b that is movable relative to the lower housing portion 2a and that defines a work surface 4. The work platform 1 is supported on an upright 20 that is supported on a base 16. Base 16 is supported on rollers or wheels 18 such that a user may push the cart over the floor. The upright 20 may be height adjustable such that the height of the work platform 1 may be adjusted to comfortably accommodate a variety of users. In one embodiment, a first vertical member 20a is supported by base 16 and telescopically supports a second member 20b. The work platform 1 is supported by the second member 20b. A lift mechanism 32 may be provided to assist the user in moving the work platform 1 and setting the height of the upright 20. The lift mechanism 32 may comprise a hydraulic cylinder as shown in FIG. 8, a counterweighted pulley system or other counterbalance mechanism that counterbalances the combined weight of the work platform 1 and the equipment supported by the work platform 1. A suitable control 22 is provided on the work platform 1 that may be manipulated by the user to operate the lift mechanism 32 and control the position of the work platform 1. The lift mechanism 32 may be designed to also support external loads such as may be applied by a user. The lift mechanism 32 may also comprise a motorized lift system. The cart may be made of a combination of materials including aluminum extrusions, sheet metal, cast metal and molded plastic.

Figure 11:
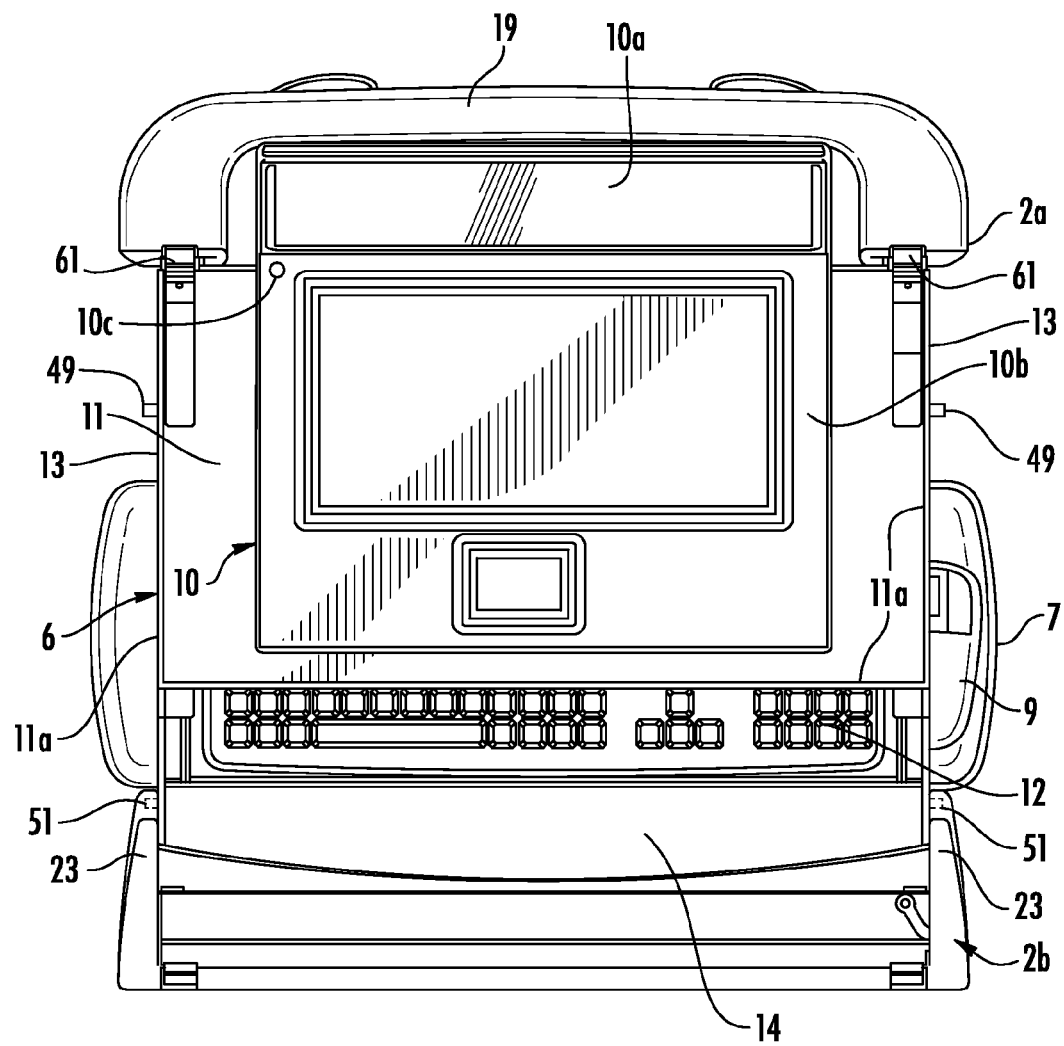
FIG. 11 is a top view of the cart of FIG. 1 in an open position.
Figure 12:
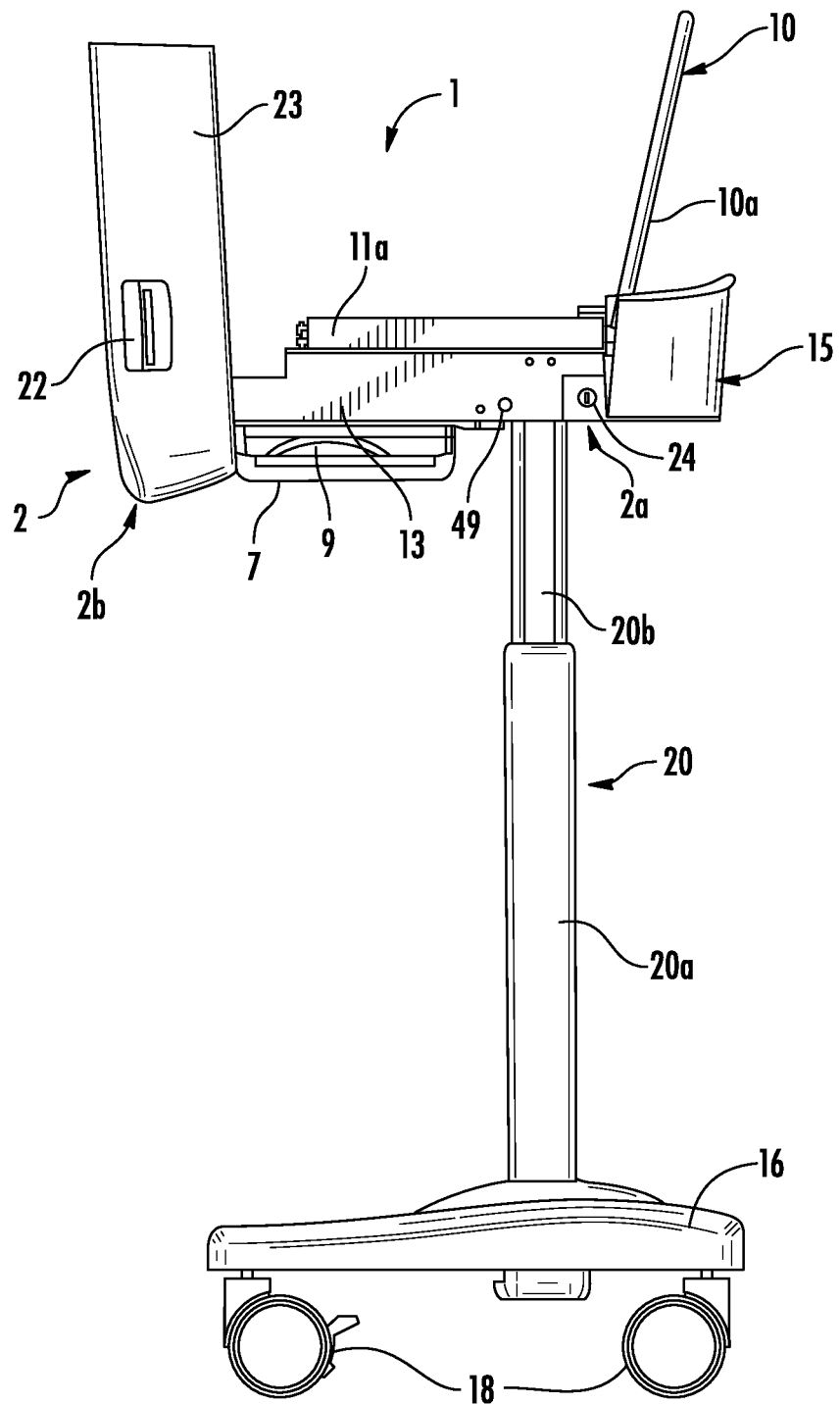
FIG. 12 is a side view of the cart of FIG. 1 in an open position.

Referring more particularly to FIGS. 8-11, a cross support 5 is mounted to the upright 20 such that adjustment of upright 20 raises and lowers the support 5. The support 5 supports a support platform 14. The support platform 14 forms a keyboard tray where the keyboard tray 14 may be movably mounted on rails (not shown) that are supported by the support 5 such that the tray 14 may be moved between a retracted position where it is located inside of the work platform 1 and an extended position where the keyboard 12 may be accessed by a user. A keyboard 12 may be supported on a keyboard tray 14 such that it is positioned inside of the work platform 1 and below the technology box 6 when the tray 14 is retracted. The keyboard 12 is a separate user interface from the user interfaces that form part of the laptop computer 10 and may be connected to the laptop computer 10 via a wired or wireless connection. The cart of the invention integrates the keyboard tray 14 and keyboard 12 into the work platform 1 and hides the keyboard tray mechanism from view. A mouse pad 3 may also be supported on the platform 14 to support a mouse 9. The mouse pad 3 is slidably mounted to platform 14 on rails 31 such that it may be slid transversely out from under the platform 14 during use of the computer. Storage compartment 17 may be secured to the bottom of mouse pad 3 for storing a mouse. The laptop computer 10 may comprise a base 10b that holds the laptop's integrated keyboard and mouse, battery and processor, and a monitor 10a that is pivotably connected to the base as is known in the art. The base 10b also includes a power button 10c that may be used to turn the laptop computer 10 on and off (FIGS. 7 and 11). The power button 10c on a laptop computer may be located in various positions on the base but is typically located near the hinge between the base 10b and the monitor 10a.

The lower housing portion 2a also includes a second support 11 that defines a substantially horizontal support platform. Support platform 11 is positioned above the mouse pad 3 and keyboard tray 14. Support platform 11 may comprise upstanding walls 11a that together define an upwardly opening technology box 6 that supports and surrounds the base 10b of the laptop computer 10. The technology box 6 may be made of metal or other suitably strong material that securely holds the base 10b of the laptop computer 10. The lower housing portion 2a also comprises side members 13 that support the first platform 3 and the second platform 11 in a stacked spaced relationship relative to one another. A cross member 15 is also connected to support 5 and may include a handle 19 that can be grasped by a user to propel the cart.

The upper housing portion 2b comprises a substantially horizontal support platform 21 that defines the work surface 4. The work surface 4 may be used to support papers, equipment or the like. A handle 25 may be formed at the front of upper housing portion 2b that may be grasped by a user to propel the cart. Extending from the platform 21 are two side members 23 that define the lateral sides of the upper housing portion 2b. When the upper housing portion 2b is in the closed, horizontal position of FIGS. 4 and 8, the technology box 6 is disposed directly below platform 21. The side walls 11a of the box 6 may be dimensioned so as to abut or nearly abut the underside of platform 21 when the upper housing portion 2b is in the horizontal position such that the platform 21 closes and secures the technology box 6. The base 10b of the laptop computer 10 may be located in the technology box 6 such that when the upper housing portion 2b is closed the base 10b is trapped in the technology box 6 and the laptop computer 10 may not be removed from the cart. The side members 23 of the upper housing portion 2b extend adjacent to and beyond the side members 13 of the lower housing portion 2a such that when the upper housing portion 2b is in the closed position the side members 23 overlap or wraparound the side members 13 to prevent access to the interior of the technology box 6 and to the base 10b of laptop computer 10.

The end 21a of support platform 21 does not extend all of the way to the rear of the technology box 6 such that when the upper housing portion 2b is closed, an upwardly opening gap 39 is created between the end 21a of the support platform 21 and the end of technology box 6. Gap 39 allows limited access to the interior of the technology box 6 from the exterior of the cart such that the monitor 10a of the lap top computer 10 may extend through gap 39 when base 10b is secured in the technology box 6. The gap 39 is dimensioned such that end 21a of platform 21 is closely adjacent to the monitor 10a when the upper housing portion 10b is in the closed position (as shown in FIG. 8).

Figure 9:
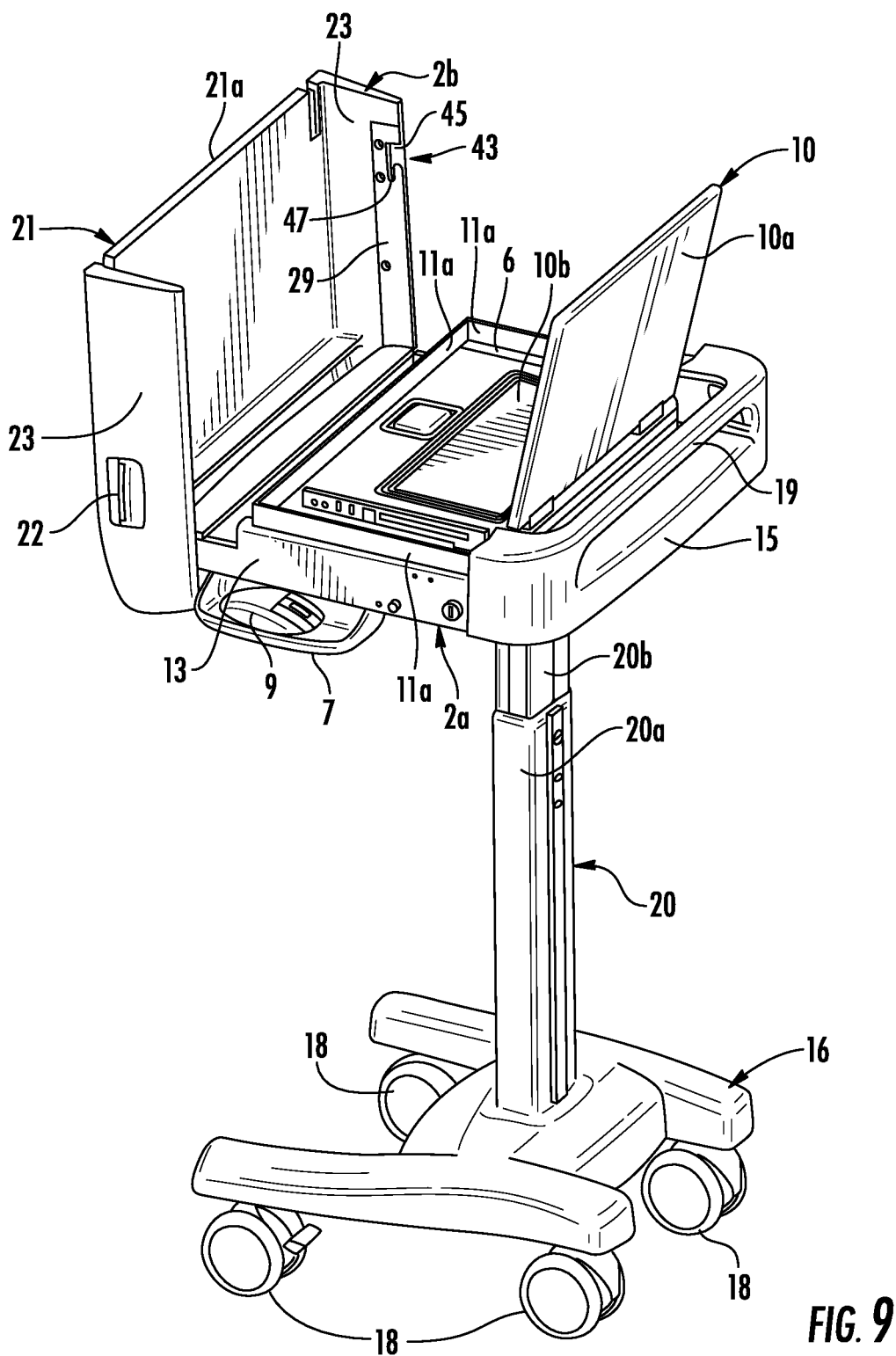
FIG. 9 is a back perspective view of the cart of FIG. 1 in an open position.
Figure 10:
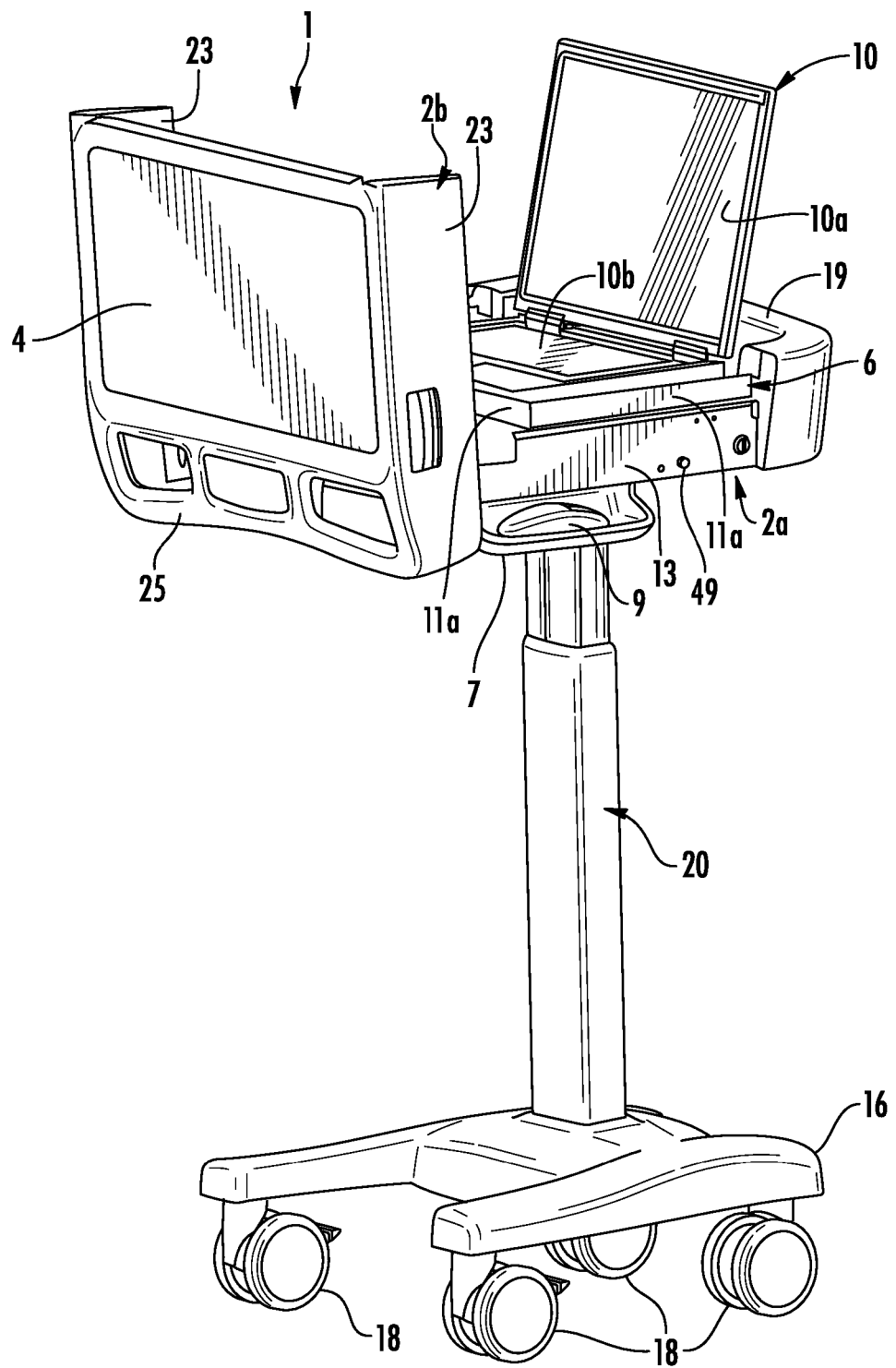
FIG. 10 is a front perspective view of the cart of FIG. 1 in an open position.

The upper housing portion 2b is pivoted to the lower housing portion 2a such that the upper housing portion 2b may pivot between an open position where the technology box 6 may be accessed and a closed position where the upper housing portion 2b secures the technology box 6. The upper housing portion 2b is also mounted for limited translational movement relative to the lower housing portion 2a to allow access to the laptop's power button 10c without unlocking the laptop from the cart. Each side wall 23 of the upper housing portion 2b comprises a front sliding hinge 41 (FIG. 5) and a rear sliding latch 43 (FIG. 9). The front sliding hinge 41 and rear sliding latch 43 may be formed as recesses that receive pins to support the upper housing portion 2b. The hinge 41 and latch 43 may be formed in an elongated plate 29 that extends along the side wall 23, or the latch 43 and hinge 41 may be formed in separate plates secured to the side walls 23, or the latch 43 and hinge 41 may be formed as inmolded areas on side walls 23 or combinations of such structures. Sliding hinge 41 comprises a linear slot 41a that extends substantially horizontally when the upper housing portion 2b is in the closed position. Latch 43 comprises slot 47 that also extends substantially horizontally when the upper housing portion 2b is in the closed position. The length of slots 41a and 47 determines the distance the upper housing portion 2b may be slid forward relative to the lower housing portion 2a to allow limited access to the laptop 10. Latch 43 comprises an open portion 45 that opens toward the bottom of the upper housing portion 2b and communicates with a first end of the slot 47. A rear pin 49 and a front pin 51 (FIG. 11) are mounted on each of the side walls 13 on the lower housing portion 2a. The pins 49 and 51 extend substantially horizontally from the walls 13. The front pins 51 extend into slots 41a to create hinge that allows the upper housing portion 2b to translate and rotate relative to the lower housing portion 2b. The rear pins 49 are positioned such that the pins 49 may extend into the rear sliding latches 43 through the open portions 45 when the upper housing portion 2b is rotated onto the lower housing portion 2a to the partially open position of FIGS. 5 and 6. In this position the upper housing portion 2b is positioned in a horizontal orientation with the pins 51 engaged with slots 41 and pins 49 engaged with slots 47 to support the upper housing portion 2b in a substantially horizontal position. From this position the upper housing portion 2b may be pushed rearward relative to the lower housing portion 2a (in the direction of arrow A in FIG. 5) to the closed position of FIGS. 2 and 4. As the upper housing portion is slid to the closed position, the slots 41a and 47 slide over pins 51 and 49, respectively, until the pins reach the ends of slots 41a and 47. The slots 41a and 47 trap the pins 51 and 49 such that the upper housing portion 2b may not be raised relative to the lower housing portion 2a. To open the cart the upper housing portion 2b is moved linearly from the closed position of FIGS. 2 and 4 to the partially open position of FIGS. 5 and 6. In this position the pins 49 are located in the open area 45. The upper housing portion 25 may then be pivoted about the front pins 51 to the fully open position of FIGS. 9-12.

Figure 5:
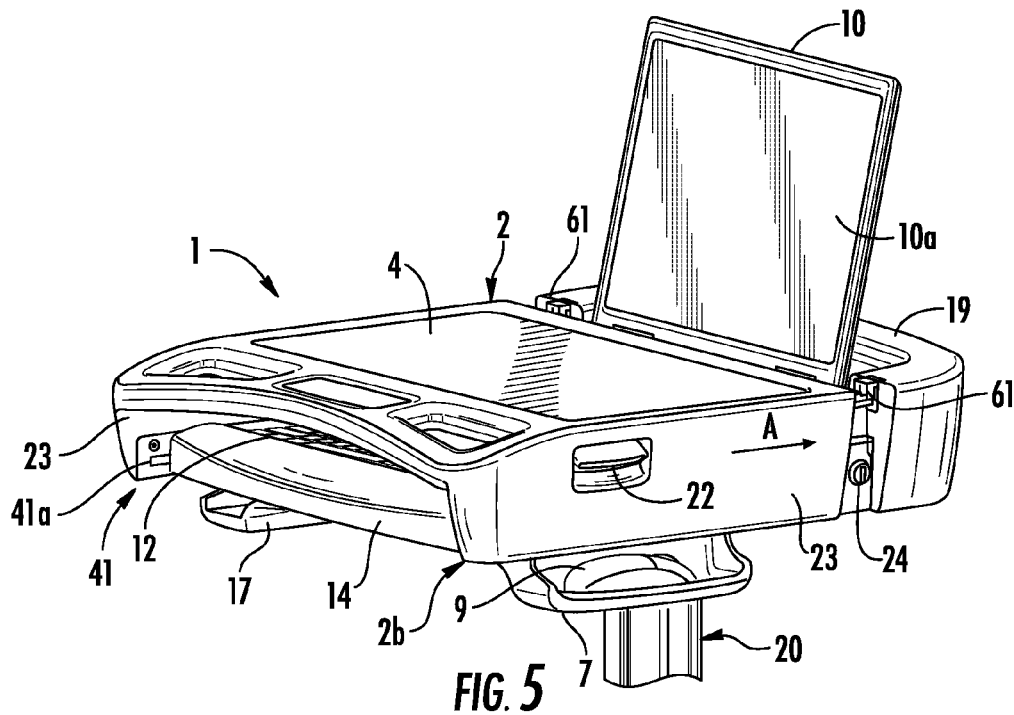
FIG. 5 is a detailed perspective view of the cart of FIG. 1 in the forward, partially open position.

To secure the upper housing portion 2b to the lower housing portion 2a the upper housing portion 2b is pivoted from the vertical open position of FIGS. 9-12 to the partially open position of FIGS. 5 and 6. As the upper housing portion 2b is pivoted closed, the rear pins 49 enter the rear sliding latches 43 through the open portions 45 until slots 47 rest on pins 49. The upper housing portion 2b is then slid rearward relative to the lower housing portion 2a to the position of FIGS. 1-3. The engagement of the pins 49 with the slots 47 prevents the upper housing portion 2b from being rotated to the open position from the fully closed position.

A pair of latches 61 may be provided to connect the upper housing portion 2b to the lower housing portion 2a to prevent a user from inadvertently pulling the upper housing portion to the forward partially open position of FIGS. 5 and 6. Each latch 61 comprises a movable latch on one of the upper housing portion 2b or lower housing portion 2a that engages the other one of the upper housing portion or lower housing portion to releasably secure the housing portions 2a and 2b together. The latches 61 may be depressed or otherwise manipulated by the user to unlatch the upper housing portion 2b from the lower housing portion 2a and allow the upper housing portion to slide forward relative to the lower housing portion. The latches 61 may comprise deformable latches that are molded integrally with the housing portions or the latches may be a separate latch secured to the housing portions. While the latches hold the upper and lower housing portions together, they are not locked such that a user may separate the housings without unlocking a lock.

As explained, upon release of the latches 61 the upper housing portion 2b is able to slide forward a limited distance relative to the lower housing portion 2a to provide limited access to the base 10b of the laptop computer 10. The forward movement of the upper housing portion 26 increases the size of gap 39 to allow a user to access the power button 10c of the laptop computer 10 (FIG. 7); however, the gap is small enough that the base 10b of the laptop computer 10 may not be removed from the technology box 6. Limiting the distance the upper housing portion 2b may move relative to the lower housing portion 2a prevents the laptop computer from being removed from the cart by unauthorized person while allowing limited access to the base 10b of laptop computer 10.

As previously explained, the work platform 2 comprises buttons or latches 61 that can be depressed or unlatched to allow the upper housing portion 2b to be pulled forward from a retracted, use position (FIGS. 1 and 4) a fixed distance to a partially open, forward position (FIGS. 5-7) allowing a user to access the power button of laptop 10 without allowing the laptop to be removed from the technology box 6. When access to the laptop base is not required, the upper housing portion is moved rearward such that a minimum gap is maintained between the housing 2 and the lap top 10.

When the upper housing portion 2b is rotated completely open to the position of FIGS. 9-12, the laptop may be completely removed from the technology box 6; therefore, to protect the physical security of the laptop, a lock 24 is provided that prevents the upper housing portion 2b from rotating from the partially open position of FIGS. 5-7 to the completely open position of FIGS. 9-12 unless the lock is unlocked. The lock 24 is located on one of the lower and upper housing portions 2a, 2b and comprises a latch that engages a strike plate or other structure on the other of the upper and lower housing portions when the upper housing portion 2b is in the forward, partially open position of FIGS. 5 and 6. The lock 24 does not prevent the upper housing portion 2b from sliding between the closed position of FIGS. 1 and 2 and the partially open position of FIGS. 5-7. In one embodiment the lock 24 is accessible only when the upper housing portion 2b is moved to the forward, partially open position such that the lock is not visible or accessible during use of the cart. Once the lock 24 is made accessible by sliding the upper housing portion 2b to the forward, partially open position an authorized person may open the lock 24 and rotate the upper housing portion 2b to the completely open position of FIGS. 9-12 to open the technology box 6 to allow access to the laptop 10 for removal or service. The lock 24 is shown as a keyed lock where a user must possess a key to open the cart; however, any suitable lock may be used including a standard combination lock, a keypad, a wireless controlled lock, a card reader or the like.

The lower housing portion 2a and upper housing portion 2b define an internal technology box 6 as previously described. The technology box 6 holds a lap top computer 10 such that the base 10b of the laptop 10 is securely held in the technology box 6 while the screen 10a extends above the work surface 4. The technology box 6 is located remotely from the work surface/keyboard stack such that a much smaller cart that has better ergonomics, lower manufacturing costs and reduced perceived size and weight is provided.

One issue with prior technology carts is the lack of access to a laptop's power button when the laptop is stored in a technology compartment. Access to power buttons is typically provided by leaving open areas around the technology compartment or by the addition of an external power button that may be tied into the LAN or USB ports of the computer. Areas open to the external environment invite tampering and create areas that make infection control more difficult. Moreover, an externally provided button on the cart may not be consistently located relative to the computer's power button such that a cart may not be usable with all types of laptop computers or will require complex electronics that allow for remote power button operation. Existing carts also have a considerable gap between the work surface and monitor. The cart of the invention provides simple and easy access to the computer power button while minimizing the gap between laptop screen and the work surface during use. Minimizing the gap between the laptop and the work surface minimizes contamination hazard.

Another issue with prior carts is the number of seams on the device because seams may make infection control difficult. The cart of the invention reduces the number of seams that are detrimental to infection control by having a large wraparound work platform 2 where the upper portion 2b wraps around the lower portion 2a, the laptop base 10b and the keyboard tray 14. The work platform 2 also conceals the technology box lock 24 during normal use, which eliminates another possible infection location. Infection control is a growing concern in the hospital environment, especially for devices such as carts that travel from room to room. The cart of the invention minimizes the potential infection locations without requiring the application of disinfectants or other similar substances to the plastic parts or metal paint. The cart of the invention has minimal seams and cleanable corners that assist the end user with infection control. The cart of the invention also limits access to the technology compartment and minimizes seams in "touch areas" while also selectively allowing access to the laptop power button.

The cart of the invention also provides an improved orientation of the technology box relative to the keyboard and monitor, when set up as a LCD/CPU configuration as shown in FIGS. 13 and 14. The cart as shown does not use a universal technology box. As a result, the technology box 6, work surface 4 and laptop computer 10 may be positioned as previously described to provide the benefits described herein. Because the cart of the invention is intended to be configured as a laptop cart in the large majority of applications, the cart is optimized for the laptop configuration. When used as a LCD/CPU cart, a clam shell enclosure 100 may be mounted behind the keyboard and below the monitor to house the computer. An LCD monitor 102 may be mounted so as to extend above the work surface. Access to the technology box 100 may be enabled in the same manner as previously described with reference to the embodiment of FIGS. 1 through 12 or the clam shell box 100 may open independently of the work station.

Typical computer carts have a considerable height discrepancy between keyboard height and work surface height that may range from 6.5 to 9 inches. The height discrepancy is typically the result of integrating a tech box to hold the CPU between the keyboard and work surface. The discrepancy means that one or the other of the work surface and keyboard is not in an ergonomically correct position. The cart of the invention has a height difference of less than 4 inches between the work surface 4 and keyboard 12 because the technology box 100 for the CPU is located vertically behind the keyboard tray 14 instead of above it. The 4 inch height difference between the keyboard 12 and work surface 4 also allows enough space for a laptop as shown in the configuration of FIGS. 1-12. This orientation is a more efficient use of space when the cart is configured in the laptop configuration. In the LCD/CPU configuration a separate LCD monitor 32 may be mounted so as to extend above the work surface 4 as shown in FIGS. 13 and 14.

Figure 1:
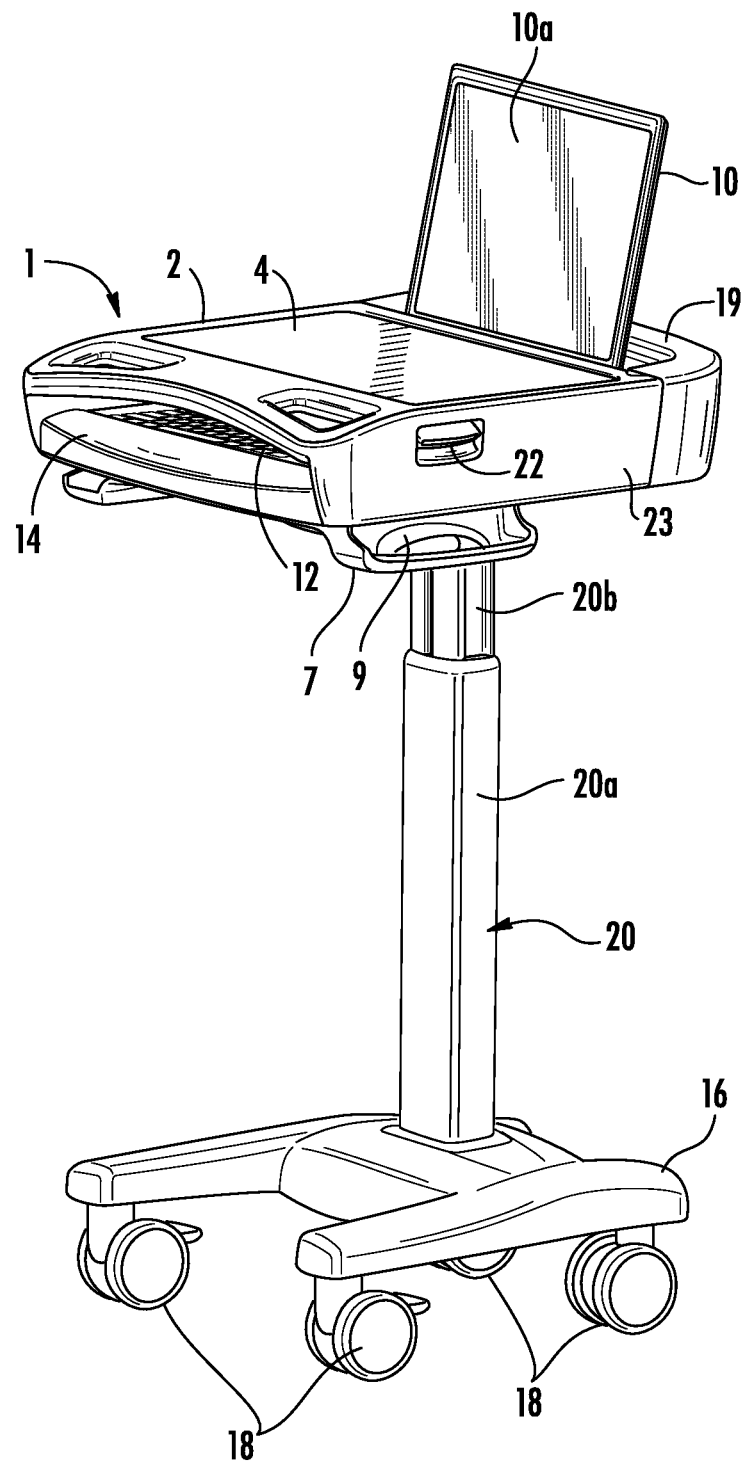
FIG. 1 is a perspective view of an embodiment of the cart of the invention with a laptop computer.
Figure 2:
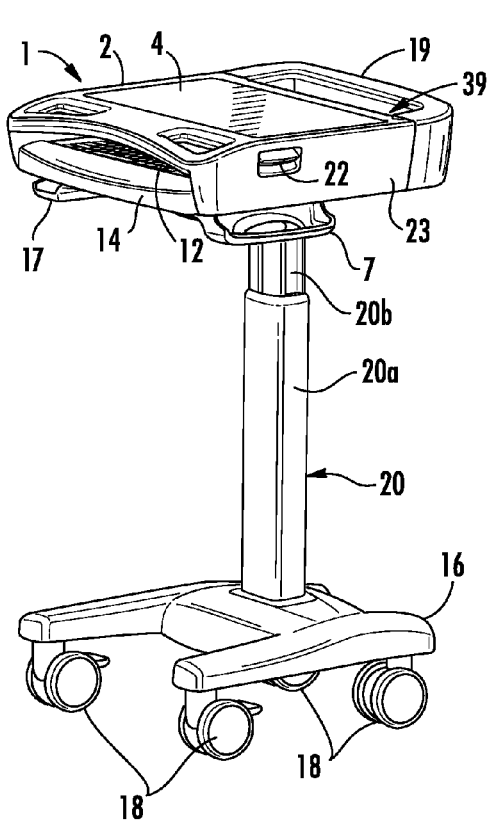
FIG. 2 is a perspective view of the cart of FIG. 1 without a computer in the closed position.
Figure 3:
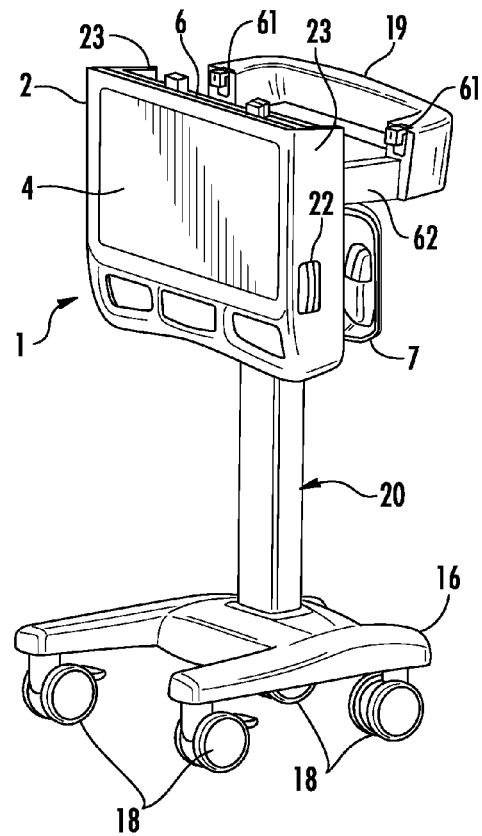
FIG. 3 is a perspective view of the cart of FIG. 1 without a computer in a storage position.
Figure 4:
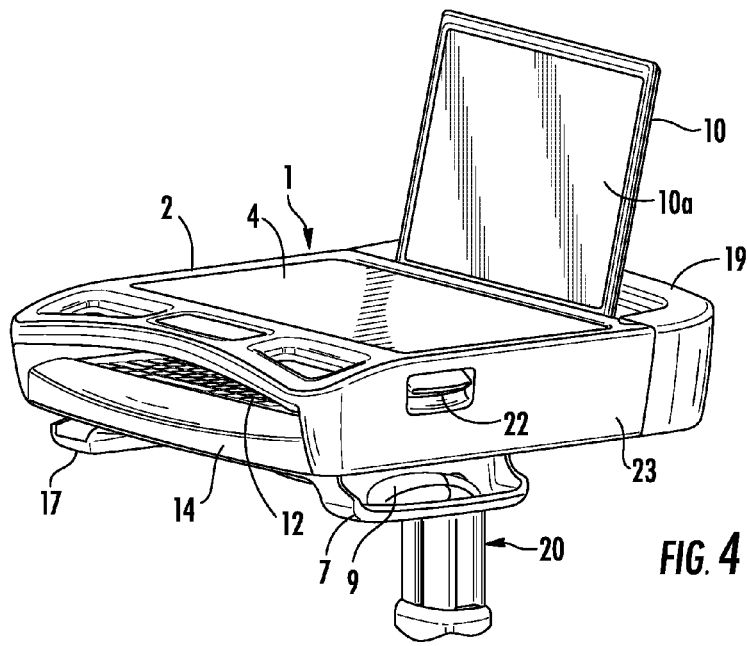
FIG. 4 is a detailed perspective view of the cart of FIG. 1 in the closed position.

Referring to FIGS. 2 and 3, in one embodiment of the cart of the invention the work platform 1 may fold down when technology such as the laptop computer 10 is not present. The folding of the work platform reduces the packaged volume of the product. The base 16 may also be removed from the upright 20 using a removable fastener such as screws or the like. The folded work platform 1, shown in FIG. 3, in conjunction with a removable base 16 makes the packaged (shipping) volume of the cart substantially smaller than existing carts. The folded cart may be 30% smaller than prior carts allowing the cart to be shipped by existing overnight carriers. The removable base 16 may be removed and packaged with the remainder of the cart for simple assembly on site. To create the foldable work station the side members 13 are mounted for rotation relative to the upright 20 and rear wall 15 such that the work station 1 may be pivoted about a horizontal axis from the normal use position of FIG. 2 to the vertical storage and shipping position of FIG. 3. A pair of stationary arms 62 may be mounted to the upright 20. The arms 62 may be connected to the side members 13 at a locking pivot connection such that the side members 13 and the entire work platform 1 may rotate about the pivot from the horizontal use position of FIG. 2 to the vertical storage and shipping position of FIG. 3

Specific embodiments of an invention are disclosed herein. One of ordinary skill in the art will recognize that the invention has other applications in other environments. Many embodiments are possible. The following claims are in no way intended to limit the scope of the invention to the specific embodiments described above.

The invention claimed is:

1. A mobile technology cart comprising:
   a first housing portion and a second housing portion mounted to the first housing portion such that a base of a laptop computer may be trapped between the first housing portion and the second housing portion with a monitor of the laptop computer extending outside of the first housing portion and the second housing portion;
   the first housing portion being movable relative to the second housing portion from a first position to a second position such that the base may be accessed without the laptop computer being removable from between the first housing portion and the second housing portion;
   the first housing portion being movable from the second position to a third position where the laptop computer is removable from between the first housing portion and the second housing portion;
   wherein the first housing portion is mounted to the second housing portion by a sliding hinge comprising a first slot on one of the first housing portion and the second housing portion and a first pin that engages the first slot on the other one of the first housing portion and the second housing portion, and a sliding latch comprising a second slot on one of the first housing portion and the second housing portion and a second pin that engages the second slot on the other one of the first housing portion and the second housing portion, the second pin being removable from the second slot when the first housing portion is in the second position but not when the first housing portion is in the first position; and
   at least one wheel supporting the first housing portion and the second housing portion.

2. The mobile technology cart of claim 1 wherein the first housing portion and the second housing portion are supported on an upright where the upright is height adjustable.

3. The mobile technology cart of claim 1 wherein the second housing portion comprises a first support that comprises a keyboard tray.

4. The mobile technology cart of claim 3 wherein the second housing portion comprises a second support positioned above the first support that defines an upwardly opening box, the base of the laptop computer being receivable in the box.

5. The mobile technology cart of claim 4 wherein the first housing portion closes the box when the first housing portion is in the first position.

6. The mobile technology cart of claim 5 wherein the first housing portion comprises a work surface the work surface being disposed above the box when the first housing portion is in the first position.

7. The mobile technology cart of claim 1 wherein a latch releasably connects the first housing portion to the second housing portion to prevent the first housing portion from moving relative to the second housing portion from the first position to the second position.

8. The mobile technology cart of claim 1 further comprising a lock for preventing the first housing portion from moving from the second position to the third position.

9. The mobile technology cart of claim 8 wherein the lock is only accessible when the first housing portion is in the second position.

10. A mobile technology cart comprising:
a housing supporting a first platform adapted to support a keyboard and a second platform adapted to support a base of a laptop computer, the second platform being disposed above the first platform;
the housing comprising a first housing portion and a second housing portion, the second housing portion covering the second platform such that a monitor of the laptop computer extends above the second housing portion, the second housing portion defining a work surface where the work surface is disposed above the second platform, the base of the laptop computer being trapped between the first housing portion and the second housing portion;
the first housing portion is movable along a linear path relative to the second housing portion from a first position to a second position such that the base of the laptop computer may be accessed without the base of the laptop computer being removed from between the first housing portion and the second housing portion, the first housing portion mounted to the second housing portion by a sliding hinge comprising a first slot on one of the first housing portion and the second housing portion and a first pin that engages the first slot on the other one of the first housing portion and the second housing portion, and a sliding latch comprising a second slot on one of the first housing portion and the second housing portion and a second pin that engages the second slot on the other one of the first housing portion and the second housing portion, the second pin being removable from the second slot when the first housing portion is in the second position but not when the first housing portion is in the first position; and
the housing being supported on at least one wheel.

11. The mobile technology cart of claim 10 wherein a latch releasably connects the first housing portion to the second housing portion to prevent the first housing portion from moving relative to the second housing portion from the first position to the second position.

12. The mobile technology cart of claim 10 wherein the first housing portion is rotatable from the second position to a third position where the laptop computer is removable from between the first housing portion and the second housing portion.

13. The mobile technology cart of claim 12 further comprising a lock for preventing the first housing portion from moving from the second position to the third position.

14. The mobile technology cart of claim 13 wherein the lock is only accessible when the first housing portion is in the second position.

15. The mobile technology cart of claim 10 wherein the housing is supported on an upright where the upright is height adjustable.

16. The mobile technology cart of claim 10 wherein the second platform defines an upwardly opening box, the second housing portion closing the box.

17. A mobile technology cart comprising:
a first housing portion and a second housing portion mounted to the first housing portion such that a base of a laptop computer may be trapped between the first housing portion and the second housing portion with a monitor of the laptop computer extending outside of the first housing portion and the second housing portion;
the first housing portion being movable relative to the second housing portion from a first position to a second position such that the base may be accessed without the laptop computer being removed from between the first housing portion and the second housing portion;
the first housing portion being movable from the second position to a third position where the laptop computer is removable from between the first housing portion and the second housing portion, and a lock for preventing the first housing portion from moving from the second position to the third position; and
at least one wheel supporting the first housing portion and the second housing portion.

18. A mobile technology cart comprising:
a housing supporting a first platform adapted to support a keyboard and a second platform adapted to support a base of a laptop computer, the second platform being disposed above the first platform;
the housing comprising a first housing portion and a second housing portion, the second housing portion covering the second platform such that a monitor of the laptop computer extends above the second housing portion, the second housing portion defining a work surface where the work surface is disposed above the second platform, the base of the laptop computer being trapped between the first housing portion and the second housing portion;
the first housing portion movable along a linear path relative to the second housing portion from a first position to a second position such that the base of the laptop computer may be accessed without the base of the laptop computer being removed from between the first housing portion and the second housing portion, and the first housing portion being rotatable from the second position to a third position where the laptop computer is removable from between the first housing portion and the second housing portion; and
a lock for preventing the first housing portion from moving from the second position to the third position; and
the housing being supported on at least one wheel.

* * * * *